United States Patent
Dollmeyer et al.

(10) Patent No.: US 8,322,129 B2
(45) Date of Patent: Dec. 4, 2012

(54) METHOD FOR CONTROLLING TURBINE OUTLET TEMPERATURES IN A DIESEL ENGINE

(75) Inventors: Thomas A. Dollmeyer, Columbus, IN (US); Jennifer W. Rumsey, Greenwood, IN (US); Larry J. Brackney, Columbus, IN (US); B. Jerry Song, Columbus, IN (US); J. Steve Wills, Columbus, IN (US); John N. Chi, Columbus, IN (US); John M. Mulloy, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 1340 days.

(21) Appl. No.: 11/356,363

(22) Filed: Feb. 16, 2006

(65) Prior Publication Data
US 2007/0186539 A1   Aug. 16, 2007

(51) Int. Cl.
*F01N 5/04*   (2006.01)
(52) U.S. Cl. ............ 60/280; 60/274; 60/285; 60/605.1; 60/608; 60/611
(58) Field of Classification Search .............. 60/274, 60/280, 285, 286, 605.1, 608, 611, 615; 123/435, 123/676
See application file for complete search history.

(56) References Cited

U.S. PATENT DOCUMENTS

| | | | |
|---|---|---|---|
| 4,719,751 A | 1/1988 | Kume et al. | |
| 4,774,811 A * | 10/1988 | Kawamura | 60/608 |
| 5,050,376 A | 9/1991 | Stiglic et al. | |
| 6,062,026 A | 5/2000 | Woollenweber et al. | |
| 6,230,683 B1 | 5/2001 | Zur Loye et al. | |
| 6,412,276 B1 | 7/2002 | Salvat et al. | |
| 6,550,464 B1 | 4/2003 | Brackney | |
| 6,568,173 B1 * | 5/2003 | Kolmanovsky et al. | 60/280 |
| 6,594,990 B2 | 7/2003 | Kuenstler et al. | |
| 6,609,372 B2 * | 8/2003 | Maddock et al. | 60/602 |
| 6,637,205 B1 * | 10/2003 | Ahmad et al. | 60/608 |
| 6,647,724 B1 * | 11/2003 | Arnold et al. | 60/608 |
| 6,659,090 B2 | 12/2003 | Sisken | |
| 6,684,630 B2 * | 2/2004 | Uchida et al. | 60/284 |
| 6,708,487 B2 | 3/2004 | Morimoto et al. | |
| 7,237,381 B2 * | 7/2007 | Kolavennu et al. | 60/608 |
| 7,305,825 B2 * | 12/2007 | Ruiz et al. | 60/602 |
| 7,617,686 B2 * | 11/2009 | Lilley et al. | 60/772 |
| 7,748,217 B2 * | 7/2010 | Muller | 60/602 |
| 2003/0056498 A1 | 3/2003 | Kuenstler et al. | |
| 2003/0101713 A1 | 6/2003 | Dalla Betta et al. | |
| 2004/0031262 A1 | 2/2004 | Gui et al. | |

FOREIGN PATENT DOCUMENTS

| | | |
|---|---|---|
| DE | 101 58 247 | 7/2003 |
| DE | 101 34 300 | 12/2003 |
| DE | 10 2004 038 122 | 7/2006 |

* cited by examiner

*Primary Examiner* — Binh Q Tran
(74) *Attorney, Agent, or Firm* — Matthew D. Fair; Krieg DeVault LLP

(57) ABSTRACT

A method and system for controlling an exhaust temperature for an internal combustion engine is disclosed. The method and system include determining a range of acceptable charge flows within the internal combustion engine to meet a desired exhaust temperature. The method and system further include controlling the charge flows to fall within the range. Control strategies to utilize the charge flow as a lever to control turbine outlet temperature are disclosed. These strategies utilize the inversion of the cylinder outlet temperature virtual sensor as well as a new turbine outlet temperature virtual sensor to determine the charge flow required to achieve the desired turbine outlet temperature given the current turbine inlet and outlet pressure, SOI, charge pressure, charge temperature, fueling, and engine speed.

23 Claims, 10 Drawing Sheets

METHOD FOR CONTROLLING TURBINE OUTLET TEMPERATURES IN A DIESEL ENGINE

RELATED APPLICATIONS

This application is related to the following co-pending applications:

Application Ser. No. 11/356,346, entitled "Method for Controlling Turbine Outlet Temperatures in a Diesel Engine at Idle and Light Load Conditions," filed on Feb. 16, 2006.

U.S. Pat. No. 6,550,464, entitled "System for Controlling Engine Exhaust Temperature," issued on Apr. 22, 2003, and assigned to the present applicant.

FIELD OF THE INVENTION

The present invention relates generally to diesel engines and more specifically to controlling turbine outlet temperatures for diesel engines to minimize emissions.

BACKGROUND OF THE INVENTION

When combustion occurs in an environment with excess oxygen, peak combustion temperatures increase which leads to the formation of unwanted emissions, such as oxides of nitrogen (NOx). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as NOx involves introducing chemically inert gases into the fresh flow air stream for subsequent combustion. By thusly reducing the oxygen concentration of the resulting charge to be combusted, the fuel burns slower and peak combustion temperatures are accordingly reduced, thereby lowering the production of NOx. In an internal combustion engine environment, such chemically inert gases are readily abundant in the form of exhaust gases. One known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold to controllably introducing exhaust gas to the intake manifold. Through the use of an on-board microprocessor, control of the EGR valve is typically accomplished as a function of information supplied by a number of engine operational sensors.

While EGR systems of the foregoing type are generally effective in reducing unwanted emissions resulting from the combustion process, a penalty is paid thereby in the form of a resulting loss in engine efficiency. A tradeoff thus exists in typical engine control strategies between the level of NOx production and engine operating efficiency, and difficulties associated with managing this tradeoff have been greatly acerbated by the increasingly stringent requirements of government-mandated emission standards.

In order to achieve the dual, yet diametrically opposed, goals of limiting the production of NOx emissions to acceptably low levels while also maximizing engine operational efficiency under a variety of load conditions, substantial effort must be devoted to determining with a high degree of accuracy the correct proportions of air, fuel and exhaust gas making up the combustion charge. To this end, accurate, real-time values of a number of EGR system-related operating parameters must therefore be obtained, preferably at low cost. Control strategies must then be developed to make use of such information in accurately controlling the engine, EGR system and/or turbocharger. The present invention is accordingly directed to techniques for controlling engine operation to maintain engine exhaust temperatures within desired operating limits.

SUMMARY OF THE INVENTION

A method and system for controlling an exhaust temperature for an internal combustion engine is disclosed. The method and system comprise determining a range of acceptable charge flows within the internal combustion engine to meet a desired exhaust temperature. The method and system further comprise controlling the charge flows to fall within the range.

Control strategies to utilize the charge flow as a lever to control turbine outlet temperature are disclosed. These strategies utilize the inversion of the cylinder outlet temperature virtual sensor as well as a new turbine outlet temperature virtual sensor to determine the charge flow required to achieve the desired turbine outlet temperature given the current turbine inlet and outlet pressure, SOI, charge pressure, charge temperature, fueling, and engine speed.

DETAILED DESCRIPTION

The present invention relates generally to diesel engines and more specifically to turbine outlet temperatures for diesel engines to minimize emissions. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
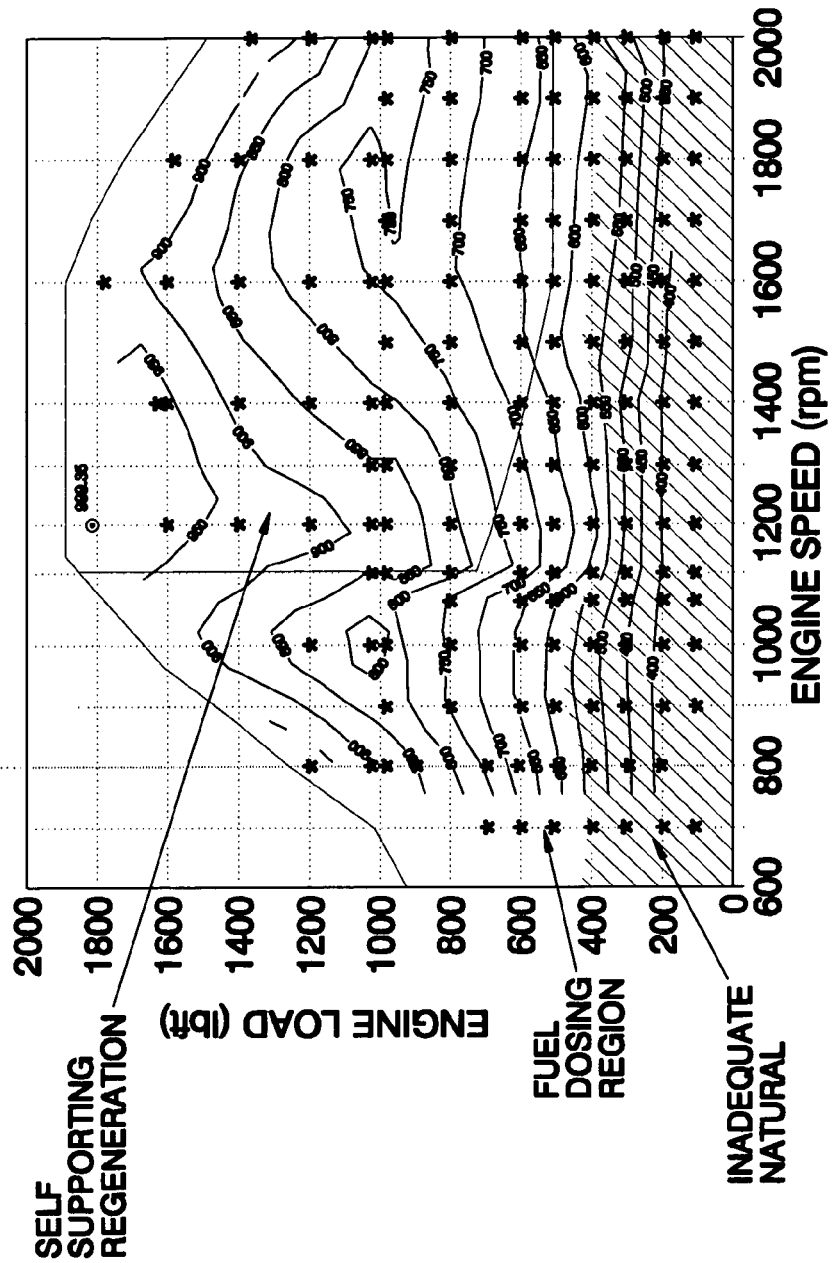
FIG. 1 illustrates a heavy duty exhaust temperature profile.

A proposed heavy-duty engine with either variable geometry and/or wastegated turbine engine architecture requires a robust filter aftertreatment system to reduce system out particulate levels to meet legislative requirements. The robust filter requires periodic regeneration to oxidize the soot stored on the filter media. These regeneration events require that the engine be capable of delivering turbine outlet exhaust temperatures high enough to allow the oxidation of the soot to occur. Turbine outlet temperatures on the order of 300 degrees Celsius (572 F) or higher may be required for prolonged periods to facilitate this regeneration. FIG. 1 illustrates a heavy duty engine exhaust temperature profile. As is seen, over much of the operating space of a heavy-duty engine, turbine outlet temperature will be greater than the minimum temperature required for regeneration. However, there is an area where thermal control strategies are required to elevate the turbine outlet temperature to facilitate aftertreatment generation.

Fundamentally, a fraction of fuel energy is used to heat up the exhaust. For a fixed expansion ratio (fixed valve timing) one can change this fraction by manipulating the gross thermal efficiency of the combustion process via injection timing and pressure, intake conditions, inert concentration via EGR, and equivalence ratio via fuel quantity and/or charge mass. In order to increase exhaust temperature, one must increase the fuel consumed and/or alter the fraction of energy transferred to the exhaust. A method and system in accordance with the present invention is directed to modulate the exhaust temperature to be at an appropriate point in a heavy engine architecture to allow for the minimization of emissions.

A method and system in accordance with the present invention takes advantage of two virtual sensors in an engine controller—one for turbine outlet temperature and a second for turbine inlet temperature to allow for driving the temperature to the appropriate point. A turbine inlet temperature virtual sensor which can be utilized to facilitate the modulation of the exhaust temperature is disclosed in U.S. Pat. No. 6,550,464, entitled "System for Controlling Engine Exhaust Temperature," issued on Apr. 22, 2003 and assigned to the assignee of the present application. A turbine outlet virtual sensor is an extension of the turbine inlet virtual sensor. It is known that turbine outlet temperature can be estimated from turbine inlet temperature, turbine inlet pressures, turbine outlet pressures plus the mass flow rate. It has also been determined that outlet temperature is related to the turbine inlet temperature by the following equation.

$$T_{out} = T_{in} \times \left(1 - n_t \times \left(1 - \frac{1}{P_r^{0.252}}\right)\right) \times F_c$$

where Tout=Turbine outlet temperature, Tin=Turbine inlet temperature, $\eta t$=turbine operating efficiency, Pr=Turbo inlet pressure/Turbo outlet pressure, 0.252=(gamma−1)/gamma, where gamma~1.337 and Fc=A correction factor to correct the slope of the final output.

Figure 2:
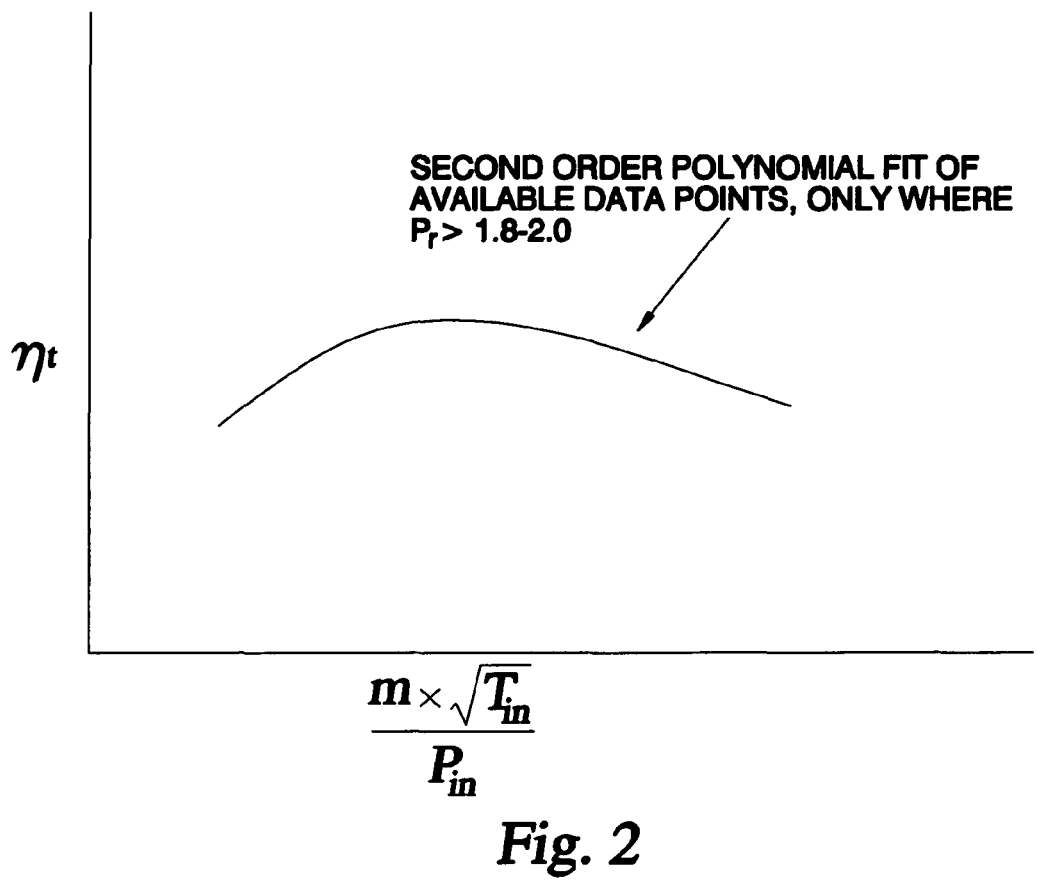
FIG. 2 is a graph which is utilized to correlate turbine efficiency ($\eta t$) to commonly measured parameters.

It is clear that the turbine efficiency ($\eta t$) can be found by a second order polynomial fit of the plot (forced through 0,0) shown in FIG. 2, where:

m=total mass flow, air plus fuel.

All other parameters defined as above.

This second order polynomial fit will generate a correlation for $\eta t$ of the form shown in equation 2.

$\eta_t = a \times x^2 + b \times x + c$ (Note that c=0)

Where:

x=the mass value from the abscissa in FIG. 2.

All other parameters are defined as in equation 1.

Figure 3:
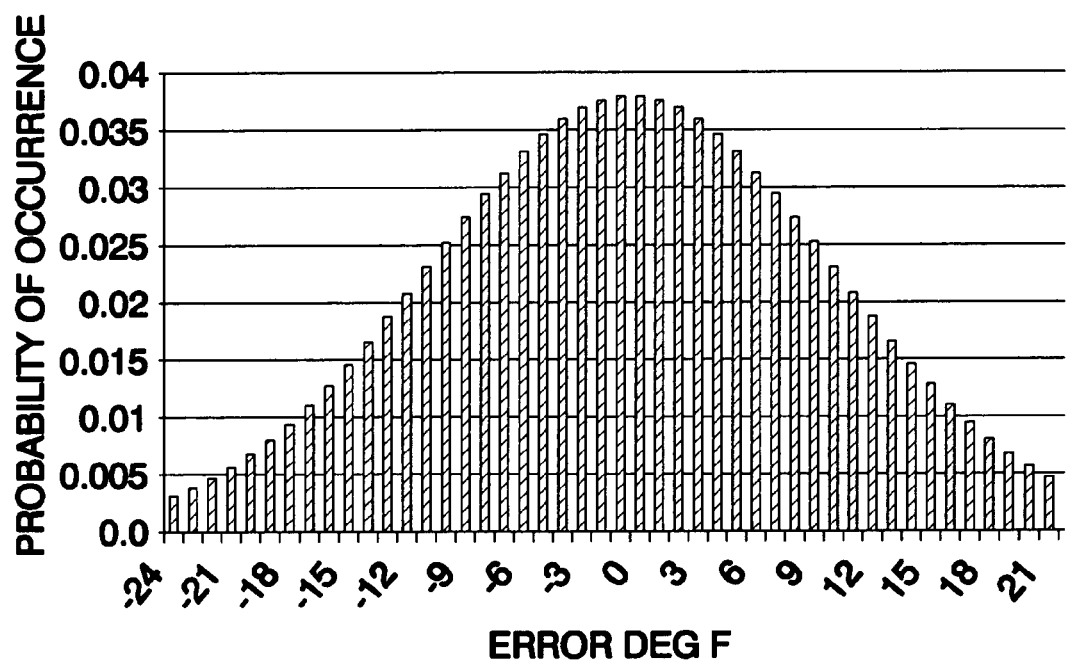
FIG. 3 illustrates the average error curve for a turbine outlet virtual sensor in accordance with Equation 1.

With $\eta t$ now a function of readily measured parameters, it could alternatively be fixed at a constant that is representative of the efficiency of the turbine with minimal impact on the algorithm. Equation 2 can be placed back into Equation 1 to yield the turbine outlet temperature as a function of "standard" inputs. In practice, these lines can be justified by changing the parameter Fc. After this justification the average error curve is shown in FIG. 3.

Accordingly, based on the turbine outlet temperature requirements as shown, the turbine outlet virtual sensor is inverted and solved for turbine inlet temperature. Once the desired turbine inlet temperature is know, a turbine inlet virtual sensor as described in U.S. Pat. No. 6,550,464 is utilized to provide the data to control the exhaust engine temperature.

Figure 4:
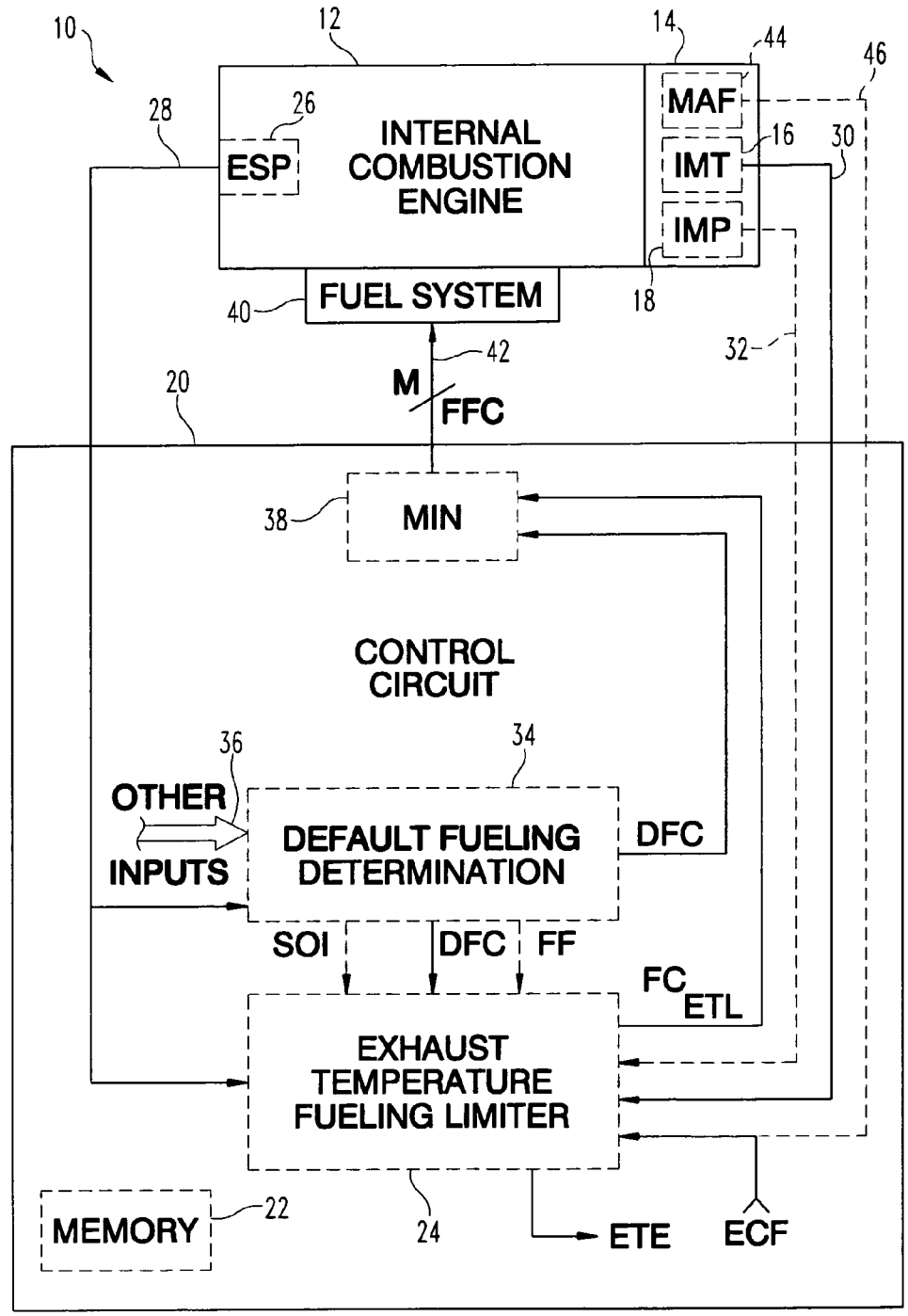
FIG. 4 illustrates one preferred embodiment of a system for controlling engine exhaust temperature, in accordance with the present invention.

To describe these features and their operation in more detail refer now to the following in conjunction with the accompanying figures. Referring now to FIG. 4, one preferred embodiment of a system 10 for controlling engine exhaust temperature, in accordance with the present invention, is shown. System 10 includes an internal combustion engine 12 having an intake manifold 14 coupled thereto. An intake manifold temperature sensor 16 is disposed within, or otherwise disposed in fluid communication with, manifold 14. Sensor 16 is preferably a temperature sensor of known construction that is operable to sense the temperature within the intake manifold 14 and produce an intake manifold temperature (IMT) signal corresponding thereto. Manifold 14 may optionally include an intake manifold pressure sensor 18 is disposed therewithin, or otherwise disposed in fluid communication therewithin, wherein sensor 16 is preferably of known construction and operable to sense a pressure within manifold 14 and produce an intake manifold pressure (IMP) signal corresponding thereto.

Engine 12 includes an engine speed sensor 26 operable to sense rotational speed of the engine 12 and produce an engine speed (ESP) signal corresponding thereto. Preferably, sensor 26 is of known construction, and in one embodiment sensor 26 is a Hall effect sensor operable to sense passage thereby of a number of teeth forming part of a gear or tone wheel. Alternatively, sensor 26 may be a variable reluctance sensor or other known speed sensor, and in any case sensor 26 is operable to produce an engine speed signal indicative of engine rotational speed.

Engine 12 further includes a fuel system 40 responsive to one or more final fuel commands (FFC) to supply fuel to engine 12. Fuel system 40 is preferably an electronically controlled fuel system of known construction, wherein the operation thereof is generally known in the art.

Central to system 10 is a control circuit 20 that is preferably microprocessor-based and is generally operable to control and manage the overall operation of engine 12. Control circuit 20 includes a memory unit 22 as well as a number of inputs and outputs for interfacing with various sensors and systems coupled to engine 12, such as those just described hereinabove. Control circuit 20, in one embodiment, may be a known control unit sometimes referred to as an electronic or engine control module (ECM), electronic or engine control unit (ECU) or the like, or may alternatively be any control circuit capable of operation as will be described in greater detail hereinafter. In any case, control circuit 20 includes a default fueling block 34 receiving the engine speed signal (ESP) from engine speed sensor 26 via signal path 28, as well as a number of additional input signals 36. Block 34 is responsive to the ESP signal on signal path 28 as well as one or more of the additional signals 36 to compute a default fueling command (DFC) in accordance with techniques well-known in the art. The default fueling command DFC may be an unrestricted FFC produced on any number, M, of signal paths 42 for controlling fuel system 40, wherein M may be any positive integer. As it relates to the present invention, however, the default fueling determination block 34 may alternatively or additionally include one or more fuel limiting algorithms designed to achieve certain engine operational goals, wherein the default fueling command DFC produced by block 34 represents an unrestricted fueling command that has been limited by one or more such fuel limiting algorithms.

In accordance with the present invention, control circuit 20 further includes an exhaust temperature fueling controller for block 24 receiving the engine speed signal (ESP) from engine speed sensor 26 via signal path 28, the intake manifold temperature signal (IMT) from the intake manifold temperature sensor 16 via signal path 30, optionally the intake manifold pressure signal (IMP) from intake manifold pressure sensor 18 via signal path 32, and the default fueling command (DFC) from the default fueling determination block 34. In a general sense, the default fueling command (DPC) typically includes timing information relating to the start-of-injection (SOI) and fuel quantity information relating to mass fuel flow (FF), as these terms are understood to those skilled in the art. In one preferred embodiment, the default fueling determination block 34 is configured to supply the exhaust temperature fueling controller block 24 with the default fueling command (DFC), and block 24 is operable to determine from DFC the values of SOI and FF in a manner known in the art. Alternatively, the default fueling determination block 34 may be configured to supply the exhaust temperature fueling controller block 24 with the SOI and/or FF values directly, wherein block 24 is operable to process either one, or both, of these values in a manner to be more fully described hereinafter.

In addition to the fueling information supplied by the default fueling determination block 34, the engine speed signal (ESP), the intake manifold temperature signal (IMT), and optionally the intake manifold pressure signal (IMP), the exhaust temperature fueling controller block 24 is configured to receive a mass charge flow value (ECF). In one preferred embodiment, the mass charge flow value (ECF) is supplied by a known software algorithm operable to compute a charge flow estimate based on certain engine operating parameter values, although the present invention contemplates that intake manifold 14 may alternatively include a mass air flow sensor (MAF) 44 of known construction supplying a charge flow value to block 24 as shown in phantom.

Referring again to FIG. 1, the exhaust temperature fueling controller block 24 preferably includes a model for estimating engine exhaust temperature (ETE), in accordance with one aspect of the present invention, wherein the engine exhaust temperature estimate is preferably a function of at least the ESP, IMT, ECF and DFC (or SOI and FF) values, and optionally the IMP value. While the engine exhaust temperature model is preferably provided in the form of an equation stored within block 24 or memory unit 22, the present invention contemplates that the model may alternatively be provided in the form of one or more graphical representations, tables, and/or the like. In any case, the exhaust temperature fueling controller block 24 is preferably operable to compute a model-based engine exhaust temperature estimate (ETE) for use in accordance with other aspects of the present invention, and/or for use by other algorithms and/or control strategies within control circuit 20.

In accordance with an aspect of the present invention, the exhaust temperature fueling controller block 24 is further operable to compute an engine exhaust temperature-control fueling command value (FCETL) as a function of the engine exhaust temperature estimation model. The exhaust temperature-control fueling command FCETL is preferably a function of the default fueling command (DFC) that is limited by block 24 as a function of an imposed maximum exhaust temperature limit (TEL) according to the exhaust temperature estimation model of the present invention, as will be described in greater detail hereinafter. In any case, the default fueling command (DFC) produced by the default fueling determination block 34 and the engine exhaust temperature-control fueling command FCETL are both provided to a MIN block 38 operable to produce as the final fueling command FFC on signal path 42 a minimum value thereof.

Figure 5:
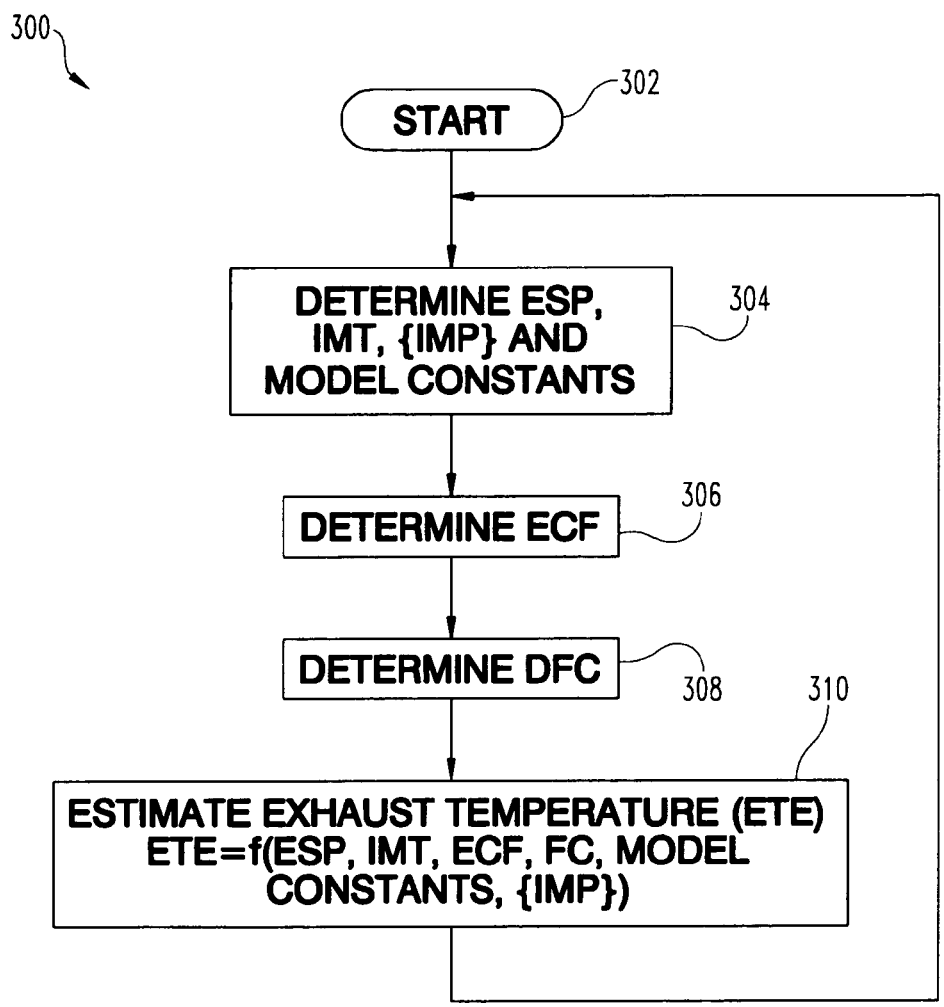
FIG. 5 is a flowchart illustrating one preferred embodiment of a software algorithm for the proper exhaust gas temperature (ETE) to control emissions.

Referring now to FIG. 5, a flowchart illustrating one preferred embodiment of a software algorithm 300 for the proper exhaust gas temperature (ETE) to control emissions, in accordance with the present invention, is shown. Algorithm 300 is preferably stored within controller block 24 and is executable by control circuit 20 to produce the exhaust temperature estimate (ETE). Algorithm 300 begins at step 302, and at step 304, control circuit 20 is operable to determine current values of engine speed (ESP), intake manifold temperature (IMT) and model constants. In a first embodiment of the present invention, block 24 is operable to estimate engine exhaust temperature (ETE) according to the model:

$$ETE = IMT + A + (B*SOI) + C/(ECF/FF) + (D*SOI)/ESP + E/[(ESP*ECF)/FF] \quad (3)$$

wherein the model constants determined at step 304 correspond to constants A, B, C, D and E in equation (3). In a second embodiment of the present invention, control circuit 20 is further operable at step 304 to determine a current value for the intake manifold pressure (IMP). In this second embodiment, block 24 is operable to estimate engine exhaust temperature (ETE) according to the model:

$$ETE = IMT + [(A*ESP) + (B*IMP) + (C*SOI) + D)] [(LHV*FF)/ECF] \quad (4)$$

wherein the model constants determined at step 304 correspond to constants A, B, C, and D in equation (4). In this embodiment, equation (4) includes an additional lower heating value of fuel (LHV) constant, which is a known constant depending upon the type of fuel used by engine 12. Regardless of whether equation (3) or (4) is used, the model constants A-E of equation (3) or A-D of equation (4) are preferably obtained as a result of one or more known data fitting techniques operable to optimize a fit between available performance data and the respective model.

In any case, algorithm 300 advances from step 304 to step 306 where control circuit 20 is operable in each of the above-described embodiments to determine a mass charge flow value (ECF). In one preferred embodiment, ECF is obtained in accordance with a known charge flow estimation algorithm such as that described with respect to FIG. 2. Alternatively, ECF may be obtained from an actual sensor such as the optional mass air flow sensor 44 shown in phantom in FIG. 1. In either case, algorithm 300 advances from step 306 to step 308 where control circuit 20 is operable in each of the model embodiments illustrated in equations (1) and (2) to determine a default fueling command (DFC). In one preferred embodiment, DFC is provided by the default fueling determination block 34, and block 24 is operable to determine start-of-injection (SOI) and mass fuel flow (FF) values therefrom in accordance with well-known techniques therefore. Alternatively, the default fueling determination block 34 is operable to provide the SOI and FF values directly to block 24. In either case, algorithm execution advances from step 308 to step 310 where block 24 is operable to compute an estimate of the engine exhaust temperature (ETE) according to either equation (1) or equation (2). Thereafter, algorithm execution preferably loops back to step 304 for continuous determination of ETE, but may alternatively return from step 310 to another calling routine.

Exhaust temperature estimation equation (1) is, in accordance with the present invention, based on a statistical sensitivity approach, and is believed to provide sufficiently accurate results for many applications. Exhaust temperature estimation equation (2) is, in accordance with the present invention, based on a model that assumes that a fraction of the fuel energy is transferred to the engine exhaust. Test data has indicated that the engine exhaust temperature estimation model represented by equation (2) is more accurate, is less sensitive to uncertainties, and is less sensitive to deterioration effects than the model represented by equation (1). Once these estimates are known, they can be utilized by equations 1 and 2, previously described, to provide the acceptable temperature ranges.

As before mentioned, inputs to the virtual sensor are charge to fuel ratio, engine speed, charge temperature, charge pressure, and SOI. It has been determined that the biggest effect in modifying turbine inlet temperature is charge to fuel ratio. It is undesirable to modify fuel flow due to the resulting change in torque. This virtual sensor is therefore inverted and solved for the charge flow required to achieve the desired turbine inlet temperature assuming that the other inputs are fixed at their current value.

Once a range of acceptable charge flows to meet the target turbine outlet temperature has been determined, the existing charge flow, which has been previously determined based on other system requirements is limited to fall within this range. In order to maintain NOx while achieving the target turbine outlet temperature value, EGR fraction is left unchanged from the previously determined required value given the NOx target at a given operating condition. Optionally, if the air handling system is unable to achieve the target EGR fraction value, the start of injection of the main fueling event can be retarded or moved later in the combustion cycle to compensate and reduce NOx.

In some cases a turbine outlet temperature limit may be required for downstream device protection. In this case, a similar approach is utilized. The turbine outlet virtual sensor is inverted to solve for the corresponding turbine inlet temperature limit. This limit is then compared to the turbine's physical temperature limit. The smaller of the two temperatures is used to calculate a corresponding fueling limit by inverting the turbine inlet virtual sensor.

Once the appropriate outlet temperatures are determined then a variety of methods can be employed to provide thermal management. Embodiments for each of these methods will be discussed hereinbelow.

Intake Throttling Methods
Post-EGR Mixer Intake Throttle

Figure 6:
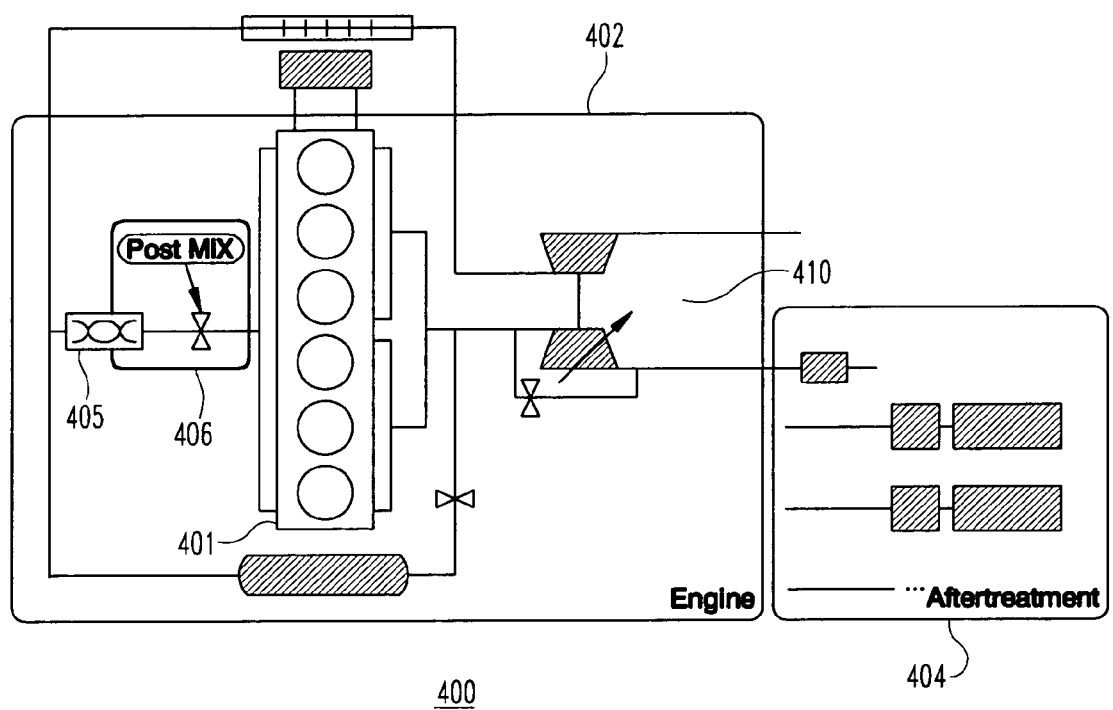
FIG. 6 illustrates a Post-EGR Mixer Intake Throttle.

FIG. 6 is a block diagram of an engine system 400 that includes a Post-EGR Mixer Intake Throttle 406. The engine system 400 includes an engine 402 and an aftertreatment system 406. In this embodiment a full authority, proportional, intake throttle 406 after the EGR mixer 43 is utilized to control the charge flow to the engine block 401 and thus the turbine outlet temperature to remove soot from the aftertreatment system 404.

Post-Charge Air Cooler (CAC) Intake Throttle

Figure 7:
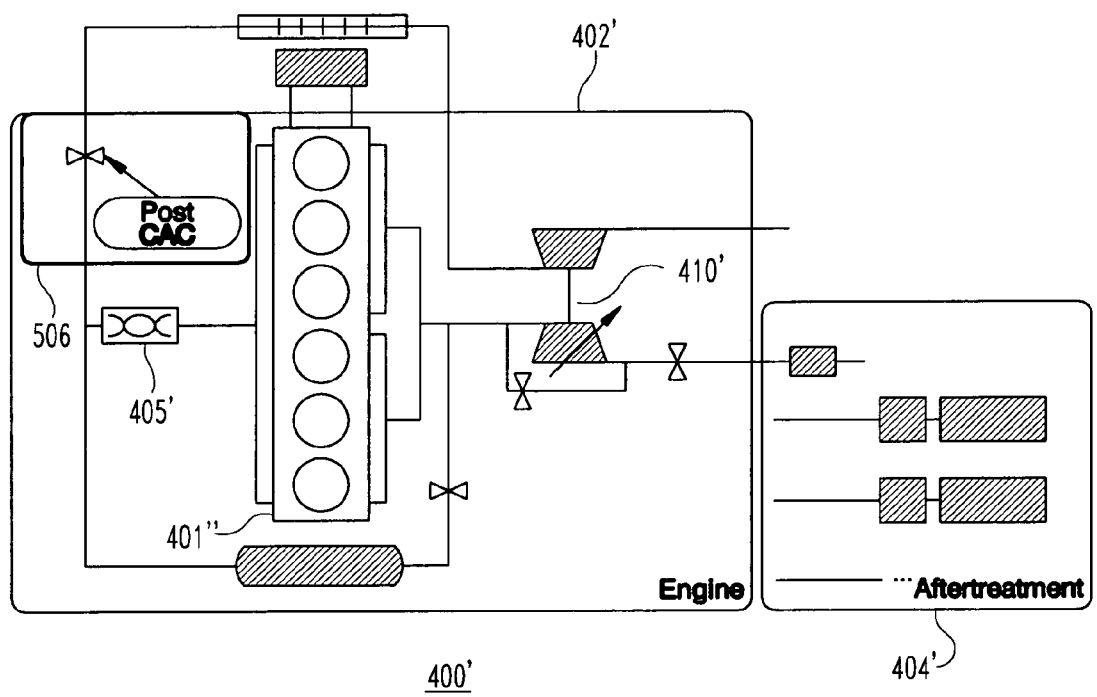
FIG. 7 illustrates a Post-Charge Air Cooler Intake Throttle.

FIG. 7 is a block diagram of an engine 400' that includes a Post-CAC Intake Throttle 502. In this embodiment, a full authority, proportional, intake throttle 506 after the charge air cooler 500 reduces the charge flow and thus the turbine outlet temperature.

Exhaust Throttling Methods
Post-Turbine Proportional Exhaust Throttle

Figure 8:
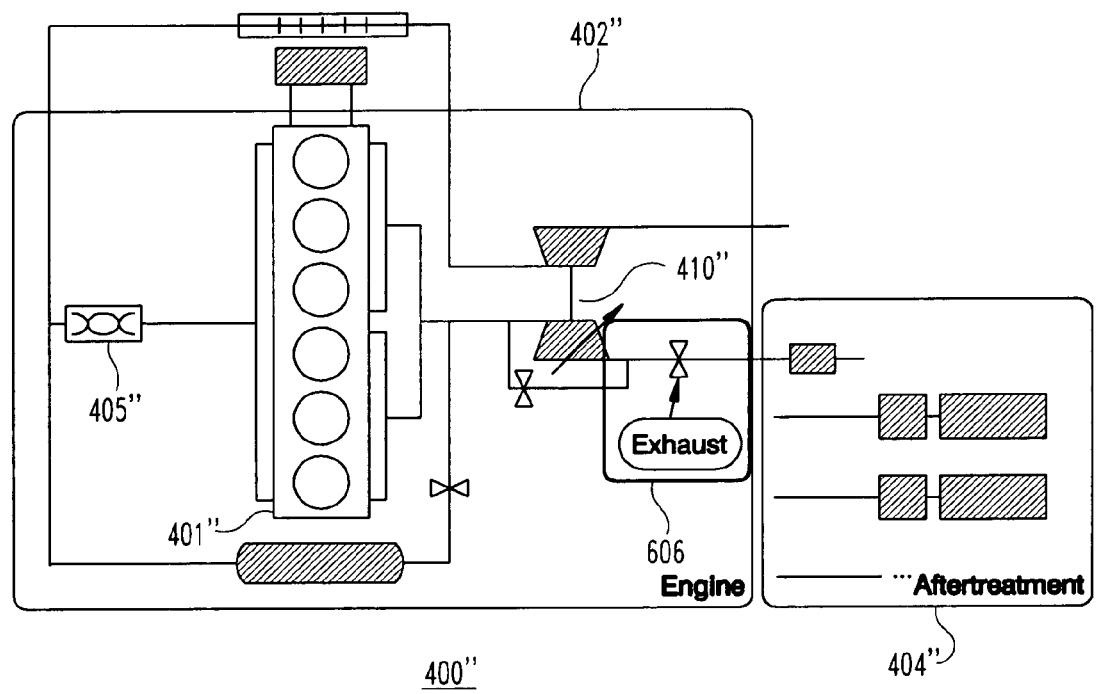
FIG. 8 illustrates a Post-Turbine Exhaust Throttle.

FIG. 8 is a block diagram for engine 400" that includes a Post-Turbine Exhaust Throttle 606. In this embodiment, a full authority, proportional, exhaust throttle 606 is utilized after the turbine to modulate charge flow and thus the turbine outlet temperature.

Post Exhaust Manifold Throttle

Figure 9:
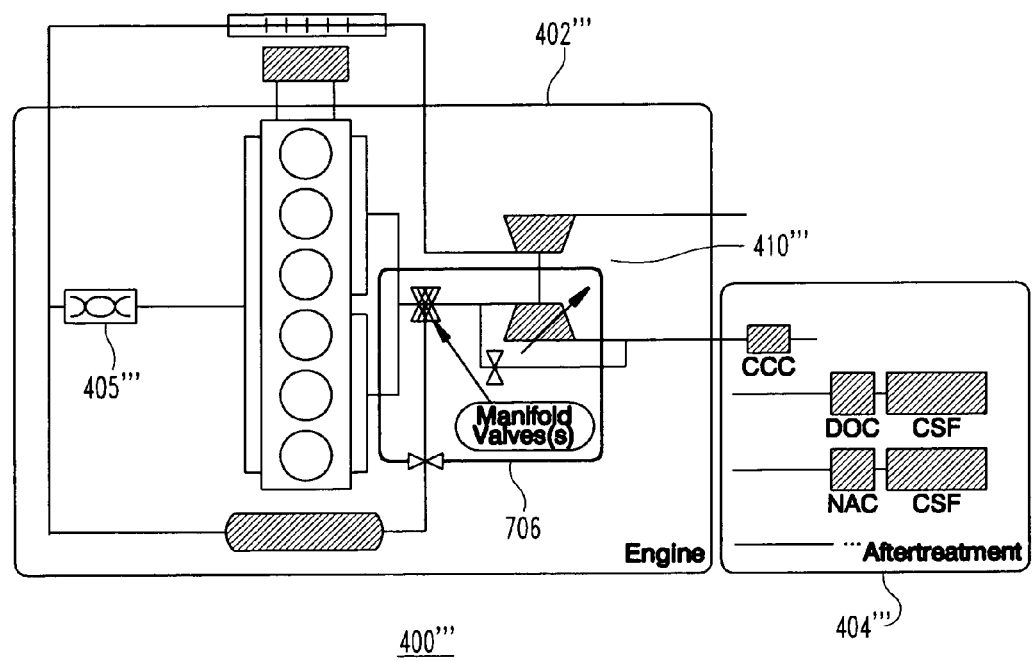
FIG. 9 illustrates an Exhaust Manifold Throttle.

FIG. 9 is a block diagram of an engine 400''' that includes an Exhaust Manifold Throttle 706.

This system utilizes an exhaust throttle 706 between the exhaust manifold and the turbine to control the charge flow and thus the turbine outlet temperature to allow for removal of soot from the aftertreatment system 404.

Figure 10:
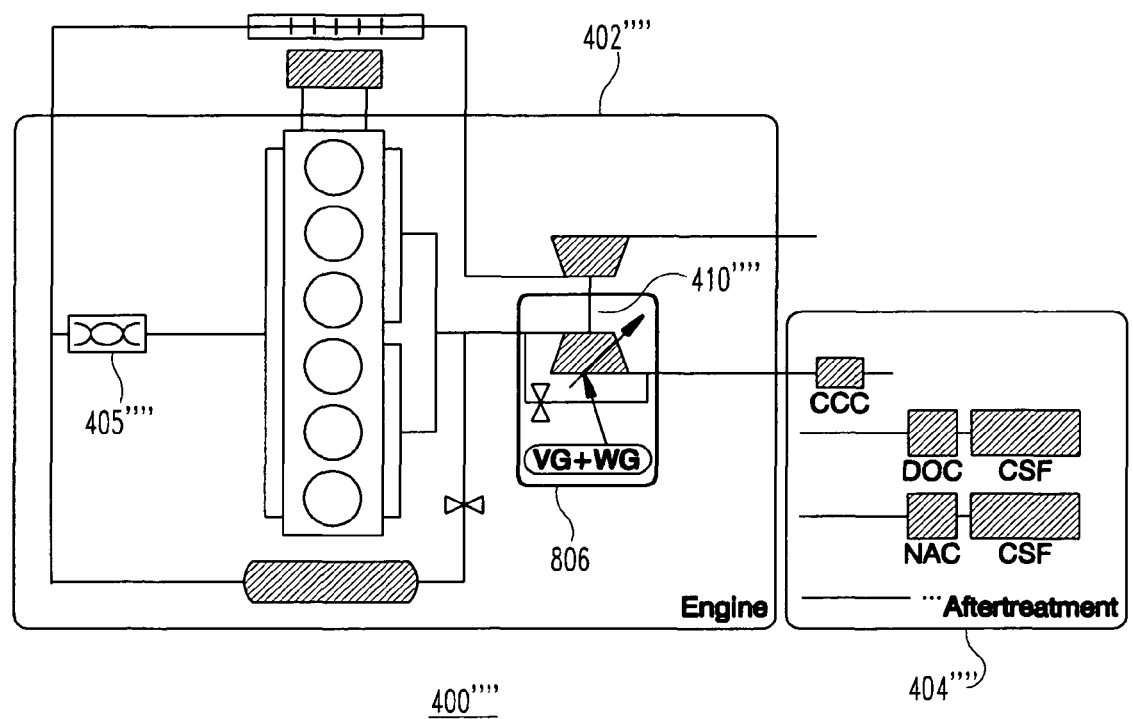
FIG. 10 illustrates Wastegate with Variable Geometry Turbine.

FIG. 10 is a block diagram of an engine 400'''' that includes a Wastegate with Variable Geometry Turbine 806.

In this embodiment, a full-authority wastegate actuator 806 enables modulation of the charge flow, while at the same time bypassing hotter exhaust gasses directly around the turbine to elevate the exhaust temperatures and modulate exhaust manifold pressure.

Accordingly, these methods can be utilized singly or in combination with the before-described virtual temperature sensors providing thermal management based on the range of desired exhaust temperatures. By moderating the charge flow a range of temperatures can be provided to the aftertreatment system that allow for the burning off of soot stored in the filter media. In so doing, the aftertreatment system can be periodically regenerated to allow it to reduce system out particulate levels to meet legislative requirements.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a turbine outlet temperature for an internal combustion engine comprising:
setting a turbine outlet temperature set point;
calculating a turbine inlet temperature set point in response to the turbine outlet temperature set point;
determining a range of acceptable charge flows within the internal combustion engine in response to the turbine inlet temperature set point; and
controlling the charge flows to fall within the range of acceptable charge flows.

2. The method of claim 1, wherein the turbine inlet temperature set point is calculated using an equation (1):

$$T_{out} = T_{in} \times \left(1 - n_t \times \left(1 - \frac{1}{P_r^{0.252}}\right)\right) \times F_c,$$

where $T_{out}$=Turbine outlet temperature, $T_{in}$=Turbine inlet temperature, $n_t$=turbine operating efficiency, $P_r$=Turbo inlet pressure/Turbo outlet pressure, and $F_c$=a correction factor.

3. The method of claim 2, wherein the range of acceptable charge flows are limited such that a limit is placed on the turbine outlet temperature set point.

4. The method of claim 1, wherein controlling the charge flow comprises changing the charge to fuel ratio.

5. The method of claim 4, wherein the charge to fuel ratio is changed by intake throttling methods.

6. The method of claim 5, wherein the intake throttling methods comprise any or any combination of a post exhaust gas recirculation (EGR) mixer intake throttle and a post-charge air cooler (CAC) intake throttle.

7. The method of claim 4, wherein the charge to fuel ratio is changed by exhaust throttling methods.

8. The method of claim 7, wherein the exhaust throttling methods comprise any or any combination of a post exhaust manifold throttle and a waste gate actuator with variable geometry turbine.

9. The method of claim 4, wherein the charge to fuel ratio is charged by any combination of intake throttling methods and exhaust throttling methods.

10. The method of claim 9, wherein the intake throttling methods comprise any or any combination of a post exhaust gas recirculation (EGR) mixer intake throttle and a post-charge air cooler (CAC) intake throttle.

11. The method of claim 10, wherein the exhaust throttling methods comprise any or any combination of a post exhaust manifold throttle and a waste gate actuator with variable geometry turbine.

12. An internal combustion engine system comprising:
    an internal combustion engine; and
    aftertreatment system coupled to a turbocharger; and
    a mechanism for controlling a turbine outlet temperature for the internal combustion engine further comprising:
    setting a turbine outlet temperature set point;
    calculating a turbine inlet temperature set point in response to the turbine outlet temperature set point;
    determining a range of acceptable charge flows within the internal combustion engine in response to the turbine inlet temperature set point; and
    controlling the charge flows to fall within the range of acceptable charge flows.

13. The internal combustion engine of claim 12 wherein the turbine inlet temperature set point is calculated using an equation (1):

$$T_{out} = T_{in} \times \left(1 - n_t \times \left(1 - \frac{1}{P_r^{0.252}}\right)\right) \times F_c,$$

where $T_{out}$=Turbine outlet temperature, $T_{in}$=Turbine inlet temperature, $\eta_t$=turbine operating efficiency, $P_r$=Turbo inlet pressure/Turbo outlet pressure, and $F_c$=a correction factor.

14. The internal combustion engine of claim 13, wherein controlling the charge flow comprises changing the charge to fuel ratio.

15. The internal combustion engine of claim 14, wherein the range of acceptable charge flows are limited such that a limit is placed on the turbine outlet temperature set point.

16. The internal combustion engine of claim 15 wherein the charge to fuel ratio is changed by intake throttling methods.

17. The internal combustion engine of claim 16, wherein the intake throttling methods comprise any or any combination of a post exhaust gas recirculation (EGR) mixer intake throttle and a post-charge air cooler (CAC) intake throttle.

18. The internal combustion engine of claim 15, wherein the charge to fuel ratio is changed by exhaust throttling methods.

19. The internal combustion engine of claim 18, wherein the exhaust throttling methods comprise any or any combination of a post exhaust manifold throttle and a waste gate actuator with variable geometry turbine.

20. The internal combustion engine of claim 15, wherein the charge to fuel ratio is charged by any combination of intake throttling methods and exhaust throttling methods.

21. The internal combustion engine of claim 20, wherein the intake throttling methods comprise any or any combination of a post exhaust gas recirculation (EGR) mixer intake throttle and a post-charge air cooler (CAC) intake throttle.

22. The internal combustion engine of claim 21, wherein the exhaust throttling methods comprise any or any combination of a post exhaust manifold throttle and a waste gate actuator with variable geometry turbine.

23. A computer readable medium containing program instructions for controlling a turbine outlet temperature for an internal combustion engine comprising:
    setting a turbine outlet temperature set point;
    calculating a turbine inlet temperature set point in response to the turbine outlet temperature set point;
    determining a range of acceptable charge flows within the internal combustion engine in response to the turbine inlet temperature set point wherein the turbine inlet temperature set point is calculated using an equation (1):

$$T_{out} = T_{in} \times \left(1 - n_t \times \left(1 - \frac{1}{P_r^{0.252}}\right)\right) \times F_c,$$

wherein $T_{out}$=Turbine outlet temperature, $T_{in}$=Turbine inlet temperature, $\eta_t$=turbine operating efficiency, $P_r$=Turbo inlet pressure/Turbo outlet pressure, and $F_c$=a correction factor; and
    controlling the charge flows to fall within the range of acceptable charge flows.

* * * * *